(12) United States Patent
Adler

(10) Patent No.: US 12,133,535 B2
(45) Date of Patent: Nov. 5, 2024

(54) BANANA PRESERVATION DEVICE

(71) Applicant: Sean Adler, Walnut, CA (US)

(72) Inventor: Sean Adler, Walnut, CA (US)

( * ) Notice: Subject to any disclaimer, the term of this patent is extended or adjusted under 35 U.S.C. 154(b) by 112 days.

(21) Appl. No.: 17/355,004

(22) Filed: Jun. 22, 2021

(65) Prior Publication Data

US 2021/0392910 A1    Dec. 23, 2021

Related U.S. Application Data

(60) Provisional application No. 63/042,376, filed on Jun. 22, 2020.

(51) Int. Cl.
*A23B 7/152* (2006.01)
*A23L 19/00* (2016.01)
(Continued)

(52) U.S. Cl.
CPC .............. *A23B 7/152* (2013.01); *A23L 19/03* (2016.08); *B65D 85/34* (2013.01); *A23V 2002/00* (2013.01)

(58) Field of Classification Search
CPC .......... A23B 7/00; A44B 19/46; A47B 75/00; A47F 7/0071; A47G 19/265; B09B 3/00; B09B 3/0075; B09B 3/20; B09B 3/21; B09B 5/00; B09B 1/00; B65D 1/265; B65D 85/34; B65D 1/0207; B65D 17/401; B65D 19/0016; B65D 19/0095; B65D 19/38; B65D 2203/02; B65D 2203/10; B65D 2231/025; B65D 2251/0018; B65D 23/00; B65D 23/003; B65D 25/00; B65D 25/02; B65D 25/04; B65D 25/24; B65D 25/28; B65D 25/54; B65D 2517/0011; B65D 2517/0041; B65D 2517/0046; B65D 2517/00019; B65D 2519/00024;
(Continued)

(56) References Cited

U.S. PATENT DOCUMENTS 4,815,628 A * 3/1989 Wehnert, III .......... B65D 51/20
                                                                  220/796
9,157,573 B1 * 10/2015 Zach ...................... B60N 3/102
(Continued)

FOREIGN PATENT DOCUMENTS

DE           1006359 B   *  4/1957   ............... B25G 1/00
GB           2425297 A   * 10/2006   ........... A47G 19/265
WO     WO-2007051467 A1  *  5/2007   ............... A23B 7/00

OTHER PUBLICATIONS

Reed, Pamela, "The Best Ways to Store Bananas", ,https://brooklynfarmgirl.com/the-best-ways-to-store-bananas/, Printed Publication (Year: 2018).*

(Continued)

*Primary Examiner* — Anthony D Stashick
*Assistant Examiner* — Marcos Javier Rodriguez Molina
(74) *Attorney, Agent, or Firm* — Donn K. Harms

(57) ABSTRACT

A banana crown cover is engageable to a banana bunch for extending the shelf life of the bananas in the banana bunch. An interior cavity of a body of the crown cover is surrounded by a sidewall of elastomer material. An annular ring, formed of elastomer material, forms a seal around said banana bunch when the crown of the banana bunch is positioned into the interior cavity and protects it from communication of gases to the crown, which cause ripening.

1 Claim, 9 Drawing Sheets

(51) Int. Cl.
*B65D 85/34* (2006.01)
*A23B 7/00* (2006.01)

(58) Field of Classification Search
CPC ........... B65D 2519/00054; B65D 2519/00059;
B65D 2519/00069; B65D 2519/00268;
B65D 2519/00293; B65D 2519/00318;
B65D 2519/00333; B65D 2519/00338;
B65D 2519/00805; B65D 2519/00815;
B65D 2519/00046; B65D 2543/00092;
B65D 2543/00509; B65D 2543/00527;
B65D 2543/00972; B65D 2571/00141;
B65D 2571/0066; B65D 2571/00728;
B65D 2571/00851; B65D 2581/055;
B65D 2583/0477; B65D 2590/0083;
B65D 2590/20; B65D 27/28; B65D
31/10; B65D 33/06; B65D 33/105; B65D
35/12; B65D 35/38; B65D 41/0414;
B65D 43/02; B65D 43/0231; B65D
43/16; B65D 43/161; B65D 43/248;
B65D 5/32; B65D 5/3635; B65D 5/4266;
B65D 5/4283; B65D 5/46; B65D
5/46008; B65D 51/222; B65D 51/225;
B65D 55/02; B65D 63/1027; B65D
65/24; B65D 65/40; B65D 71/70; B65D
75/04; B65D 75/56; B65D 77/0486;
B65D 77/067; B65D 81/053; B65D
81/1075; B65D 81/2015; B65D 81/24;
B65D 81/3862; B65D 81/3876; B65D
81/3879; B65D 83/00; B65D 83/0005;
B65D 83/0817; B65D 83/0835; B65D
83/0847; B65D 83/201; B65D 83/206;
B65D 85/12; B65D 85/30; B65D 85/78;
B65D 85/804; B65D 90/48; B65D 1/26;
B65D 1/34; B65D 11/04; B65D 19/0026;
B65D 19/0028; B65D 19/40; B65D
21/0228; B65D 21/0233; B65D 2203/12;
B65D 2211/00; B65D 2251/0071; B65D
2251/1083; B65D 23/085; B65D 23/14;
B65D 2313/04; B65D 25/10; B65D
25/205; B65D 25/282; B65D 25/30;
B65D 25/52; B65D 2517/002; B65D
2517/0022; B65D 2517/0052; B65D
2519/00019; B65D 1519/00029; B65D
2519/00034; B65D 2519/00064; B65D
2519/00273; B65D 2519/00288; B65D
2519/00323; B65D 2519/00562; B65D
2519/00572; B65D 2525/286; B65D
2543/00046; B65D 2543/00277; B65D
2543/00296; B65D 2543/00537; B65D
2571/0045; B65D 2571/0058; B65D
2571/00845; B65D 2581/0055; B65D
2583/0431; B65D 2583/0445; B65D
27/06; B65D 27/14; B65D 27/20; B65D
31/12; B65D 33/00; B65D 33/004; B65D
33/12; B65D 33/14; B65D 33/28; B65D
37/00; B65D 41/005; B65D 41/04; B65D
43/0212; B65D 43/022; B65D 5/0005;
B65D 5/061; B65D 5/248; B65D 5/3657;
B65D 5/4204; B65D 5/422; B65D 5/441;
B65D 5/446; B65D 5/448; B65D 5/4608;
B65D 51/00; B65D 51/1683; B65D
51/24; B65D 51/245; B65D 53/02; B65D
65/06; B65D 65/08; B65D 65/22; B65D
65/466; B65D 71/00; B65D 71/36; B65D
75/58; B65D 77/0406; B65D 81/022;
B65D 81/03; B65D 81/052; B65D
81/113; B65D 81/1275; B65D 81/18;
B65D 81/3802; B65D 81/3825; B65D
81/3886; B65D 81/3897; B65D 83/005;
B65D 83/0072; B65D 83/0811; B65D
83/0888; B65D 83/0894; B65D 83/22;
B65D 83/222; B65D 83/24; B65D 85/66;
B65D 85/72; F17C 1/00; F17C
2203/0619; F17C 2203/0641; F17C
2203/0643; F17C 2203/0675; F17C
2209/221; F17C 2209/232; F17C
2209/234; F17C 2223/033; F17C
2223/035; F17C 2223/036; F17C
2260/012; F17C 2270/0131; F17C
2270/0165; F17C 1/06; F17C 1/14; F17C
1/16; F17C 2201/0109; F17C 2201/056;
F17C 2203/0604; F17C 2203/0648; F17C
2203/0663; F17C 2209/2181; F17C
2221/011; F17C 2221/012; F17C
2223/0115; F17C 2223/0161; F17C
2260/011; F17C 2270/0105; F17C
2270/0168; F17C 2270/0171; F17C
2270/0176; F17C 2270/0178; F17C
2270/0189; F17C 2270/0194; Y10S
206/818; B60R 13/00; F16B 5/065; F16B
5/0664; F16B 2/22; F16B 21/086
USPC ...... 426/132; 206/459.5, 5.1, 277, 364, 365,
206/459.1, 472, 524.1, 531, 532, 533,
206/534, 535, 538, 571, 572; 220/200,
220/211, 23.83, 23.86, 253, 254.3, 254.6,
220/254.9, 260, 262, 263, 264, 345.1,
220/475, 476, 483, 484, 495.01, 495.04,
220/495.05, 495.06, 495.07, 495.08,
220/495.11, 500, 521, 523, 529, 533, 551,
220/571, 592.1, 592.2, 666, 694, 8, 810,
220/9.4, 908, 908.1, 909, 6, 89.1, 592.21,
220/600, 603, 660, 692, 770, 787, 827,
220/833, 908.2, 1.5, 23.4, 23.87, 23.91,
220/230, 241, 268, 3.2, 3.3, 324, 326,
220/375, 379, 4.13, 4.22, 478, 482, 495,
220/495.02, 495.1, 503, 505, 507, 527,
220/528, 570, 574, 575, 592.13, 592.17,
220/592.24, 669, 675, 677, 697, 7, 735,
220/739, 751, 752, 754, 756, 781, 86.1,
220/912, 914; 215/11.6, 203, 216, 220,
215/230, 386, DIG. 3
See application file for complete search history.

(56) References Cited

U.S. PATENT DOCUMENTS

2005/0249850 A1* 11/2005 Scalise .................. B65D 81/03
426/410
2014/0238887 A1* 8/2014 Ivankovic ............ A47G 19/265
206/514

(56) References Cited

U.S. PATENT DOCUMENTS

2016/0120760 A1\* 5/2016 Nazginov .............. B65D 83/04
                                                    215/230
2019/0061589 A1\* 2/2019 Scott .................. A47G 19/2261

OTHER PUBLICATIONS

Reed, Pamela, "The Best Ways to Store Bananas", ,https://obrooklynfarmgirl.com/the-best-ways-to-store-bananas/, Printed Publication (Year: 2018) (Year: 2018).\*

\* cited by examiner

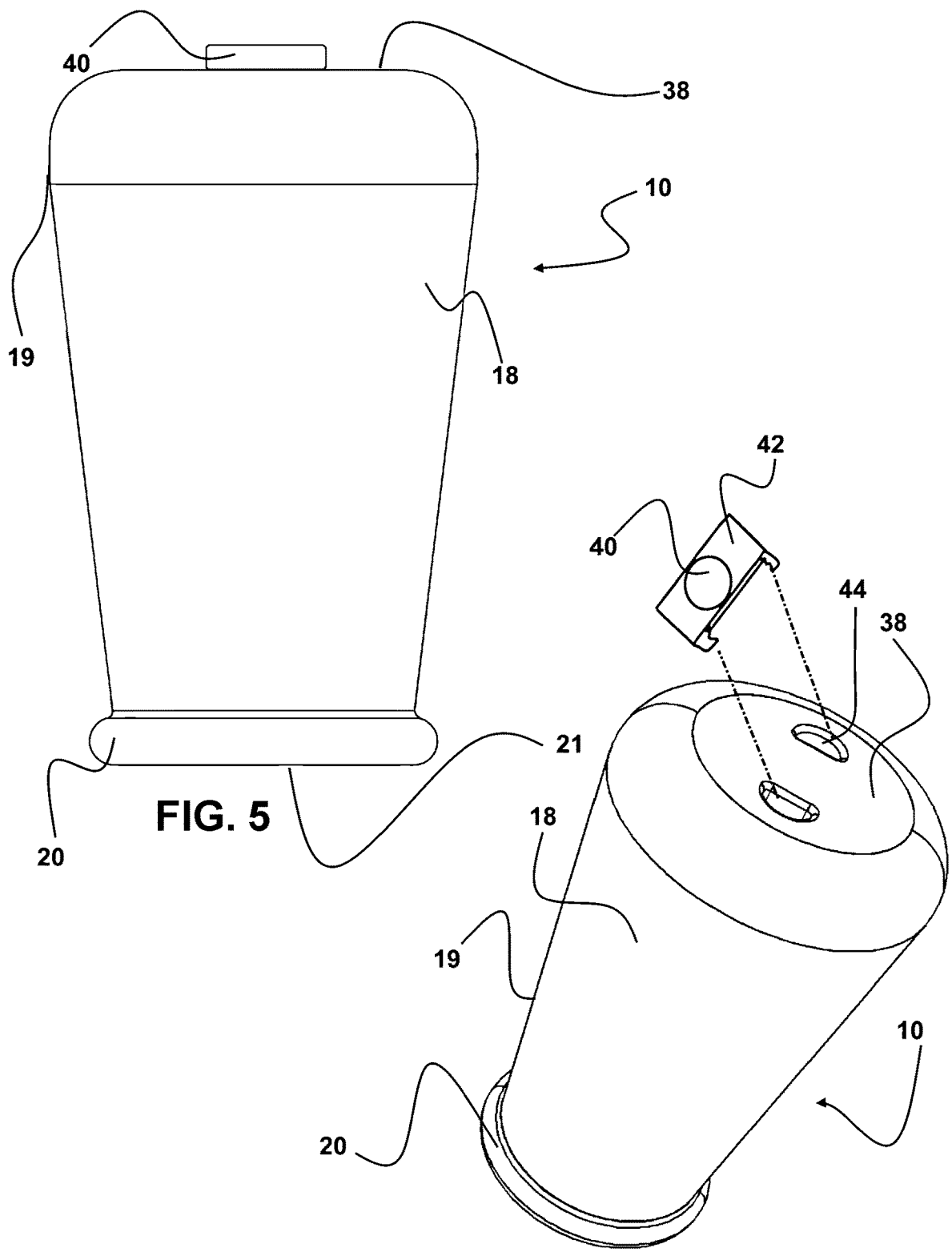

BANANA PRESERVATION DEVICE

This application claims priority to U.S. Provisional Patent Application Ser. No. 63/042,376 filed on Jun. 22, 2020, which is incorporated herein in its entirety by this reference thereto.

BACKGROUND OF THE INVENTION

1. Field of the Invention

The invention herein disclosed relates generally to the preservation of bananas for consumption. More particularly, it relates to a device sealing the crown of a banana bunch from surrounding air to enable the bananas in the bunch to be edible for a longer time duration.

2. Prior Art

Background of the Invention

In the production of fruit, such as bananas, for commercial sale in stores, most are harvested while unripe. Ripening agents may be employed subsequently, such as ethylene, to ripen the bananas to turn the skins from green to somewhat yellow for sale.

Bananas placed on sale in such a commercial environment are generally sold in bunches where each banana fruit extends from an engagement to a crown portion holding the bunch of bananas together. Buyers will conventionally choose the bunch of bananas from the sales stand for purchase.

Bananas sold in such bunches, while on sale and once purchased, are continuously undergoing a ripening process where the peel will change color from a more greenish color to a yellow color. The peels will continue to change color from yellow to brown to black, as the enclosed banana ripens and over ripens.

Because bananas are purchased in a group, some buyers may be challenged to consume all of the bananas in such a bunch before they over-ripen. While over ripe bananas may work well for baking such delicacies as banana bread, the taste to most consumers will become too sweet, and the consistency of the banana will turn soft, liquidly and undesirable. Consequently, for many buyers and especially for buyers who must consume the banana bunch themselves prior to the over-ripening of some of the bunch, they have a short duration of time to eat all of the bananas before they turn.

With respect to the above, before explaining at least one preferred embodiment of the banana bunch preservation system herein, it is to be understood that the system invention is not limited in its application to the details of employment and to the arrangement of the components or the steps set forth in the following description or illustrated in the drawings. The various components and configurations herein disclosed for the crown-engageable device are capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based, may readily be utilized as a basis for other crown sealing and purchase dating systems.

It is important, therefore, that the embodiments, objects and claims herein be regarded as including such equivalent construction and methodology insofar as they do not depart from the spirit and scope of the present invention.

SUMMARY OF THE INVENTION

In this summary description, any directional prepositions if employed, such as up, upwardly, down, downwardly, front, back, top, upper, bottom, lower, left, right and other such terms refer to the device or depictions as they may be oriented are for convenience only in describing such as it appears in the drawings. Such terms of direction and location are not intended to be limiting in ay fashion, or to imply that the device or method herein has to be used or positioned with graphics in any particular orientation. Further, in not otherwise defined, by the term substantially is meant, plus or minus five percent.

The disclosed device herein, provides a solution to the over-ripening of a bunch bananas and the inability to discern how long bananas have been sitting through the provision of a device to elongate the time bananas in a bunch engaged to a crown portion ripen. By lengthening the duration of time each banana in the bunch requires to ripen, the user is provided with a longer duration to consume the bananas in a bunch. This provision of longer ripening times thus lessens waste from bananas not being consumed, as well as allows the user to have a plurality of ripe bananas to choose from for eating.

The device, in all modes, includes a substantially sealed cavity which is engageable around the crown portion engaged to one end of each of a bunch of bananas. The sealed cavity, once engaged around the crown, will significantly limit the amount of oxygen and ethylene which reaches the crown portion, from that which would reach it without the device, to thereby slow the ripening process which is controlled by communication of oxygen and ethylene communicated to the crown of the banana bunch.

In the preferred mode of the device herein, an elastic body has a cavity which is engageable around the crown portion of a banana bunch. The engagement of the device, to position the cavity to surround the crown portion, is accomplished by stretching the elastomer or polymeric material forming the body and an opening to the cavity to a size larger than the circumference of the crown of the banana bunch. The user then releases the stretched polymeric material forming the body, to thereby allow the circumference surrounding the opening to the cavity to form a sealed engagement on a circumferential surface of the crown portion of the banana bunch. By polymeric material or elastic material, as used herein, is meant an elastomer, elastomeric polymer or thermoplastic elastomer material, which will stretch from its static form with force and return to the static form or size and shape, once the force stretching it is removed. Such for example can be rubber, synthetic rubber, polybutadiene, polyisobutylene, polyurethanes, and any other elastomer as would occur to those skilled in the art to form the body of the device herein.

Once so engaged, the interior cavity of the body seals around the crown portion of the bunch and will prevent or limit the amount of ripening gases which reach the crown. This significantly elongates the duration of time required for each banana in the bunch to ripen.

The body of the device can be engaged with a hat or covering which may be whimsical but is, in fact, also quite functional. In one preferred mode of the covering, it may be color coded or have letters or indicia thereon to allow the user to determine the date on which the device was engaged. This dating function will be especially helpful in use where many banana bunches are purchased for consumption by many individuals over a time duration, for example, a school cafeteria.

In another preferred mode of the device the elastomer body can be configured with a connector to engage a hat or cap thereon. Additionally, a hanger may be provided as part of the body of the device. The hanger may be an opening in a projection portion of the body through which a hook or the like can engage with the crown capping device, to thereby hold the entire bunch of bananas suspended. Such will prevent bruising and over ripening of areas of the bunch which may come into contact with a support surface.

The elastomer body forming the sealed cavity has a sidewall extending from an endwall to an opening through which the banana crown may be inserted into the interior cavity. The sidewall, as well as the body, is formed of a material such as an elastomer material.

Particularly preferred at or adjacent the opening is at least a first annular ring that surrounds the opening and which is formed of the same elastomer material as the body. This first annular ring is defined by a circular or thicker annular portion of the sidewall located at or immediately adjacent the opening to the internal cavity. So positioned, this first annular ring provides an annular constriction of the sidewall of the body which imparts more elastic resistance to stretching. Likewise is provided an increase in contact against the crown portion or upper end of the bunch of bananas when they are operatively engaged with the device with the crown portion within the internal cavity. This increase in elastic force forms a biased contact of the first annular ring and the sidewall engaged therewith, to form a biased encircled contact with the crown portion of the bunch of bananas.

The body of the device, in a mode offering an even better seal to a bunch of bananas to keep ripening gases from the crown portion, may also include a second annular ring formed of the elastomer material of the sidewall. The second annular ring runs parallel to the first annular ring, which is spaced a distance therefrom. Currently, a distance of substantially 1-3 inches has shown to work well depending on the dimensions of the body and sidewall. A distance of substantially 1 inch, in experimentation, has shown to provide a second seal around the crown end of a bunch of bananas. Where a first ring and second ring are employed, the first ring can be positioned upon the exterior of the skins of the bananas connected to the crown to form a biased seal therearound, and the second seal formed by the second ring tends to locate to form a biased encircling seal in a recess adjacent the crown and the connection of the bananas thereto.

In all modes of the device, a connection may be provided to removably engage a cap to the body at the endwall thereof. Currently, a magnet connected to the endwall has shown to provide such a connection for a removable cap which preferably bears indicia as to the day the body of the device was engaged to the banana bunch. This magnet may be adhered to the endwall or may be engaged with a connector that grips the endwall to hold the magnet in place.

As also shown herein in another preferred mode, the annular first ring adjacent the opening to the internal cavity for surrounding the crown of an engaged bunch of bananas may be formed by folding the sidewall of elastomer material over on itself and around the crown portion of the banana bunch. Once folded, a first body portion is engageable to a second body portion to both form an encircled biased seal and hold the elastomer material forming the sealed cavity in a mounted engagement with the crown. In this mode, the cap or hat having colors, lettering, or other date identifying indicia thereon, can be engaged to a mount on one of the two body portions.

With respect to the above description, before explaining at least one preferred embodiment of the banana preservation and ripening elongation system herein, it is to be understood that the invention is not limited in its application to the details of operation nor the arrangement of the components or the steps set forth in the following description or illustrations in the drawings. The various methods of implementation and operation of the device herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other devices for carrying out the several purposes of the disclosed banana crown sealing and ripening system herein. Therefore, that the objects and claims herein should be regarded as including such equivalent construction, steps, and methodology insofar as they do not depart from the spirit and scope of the present invention.

It is an object of this invention to provide an easily engaged device which forms a sealed cavity around the crown portion of a bunch of bananas to elongate the time duration for ripening of the fruit.

It is a further object of this invention to provide such a ripening elongation device and system which also provides a component for the viewable date determination of the banana bunch so engaged, and optionally forms a support for a hook or suspension system to hold the bunch elevated above a support surface.

These together with other objects and advantages which become subsequently apparent reside in the details of the construction and operation of the system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURES

The accompanying drawings which are incorporated in and form a part of this specification illustrate embodiments of the invention and together with the description serve to explain the principles of this invention.

FIG. 5 depicts a side view of the device, similar to that of FIGS. 1-3, showing the sidewall extending from an opening at the first end which is surrounded by a first ring, to the endwall which has a magnet affixed thereto.

FIG. 6 shows a perspective view of the device, as in FIG. 5, showing two recesses formed into the exterior of the endwall where a clip holding a magnet can engage to the body.

DETAILED DESCRIPTION OF THE PREFERRED EMBODIMENTS OF THE INVENTION

Figure 1:
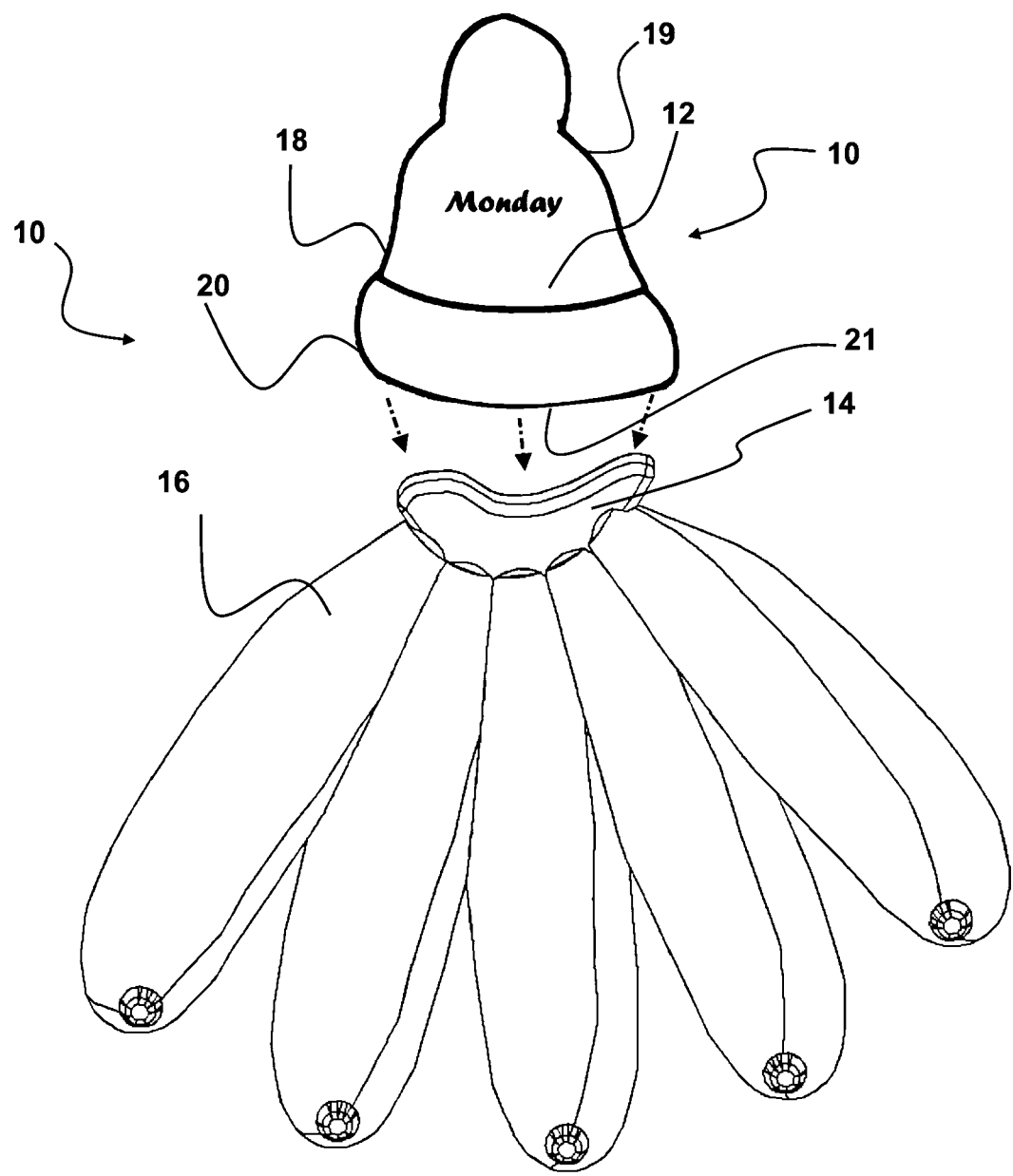
FIG. 1 depicts an exploded view of the device and system herein showing an elastomer body of the device having an opening at a first end stretched to engage over and form a biased encircled seal upon the crown of a bunch of bananas.

In this detailed description, the directional prepositions of up, upwardly, down, downwardly, front, back, top, upper, bottom, lower, left, right and other such terms refer to the device as it is oriented and appears in the drawings and are used for convenience only. Any such terms are not intended to be limiting or to imply that the device has to be used or positioned in any particular orientation.

Referring now to the banana bunch engageable device 10, herein shown in the depictions of FIGS. 1-13, there is shown in FIG. 1 an exploded view of one favored mode of the device 10 and system herein. As shown, the device 10 includes an elastomer body 18 of the device 10 which is adapted to be pulled to a stretched configuration which, once released, will engage over and seal upon the crown 14 of a bunch of bananas 16.

Figure 2:
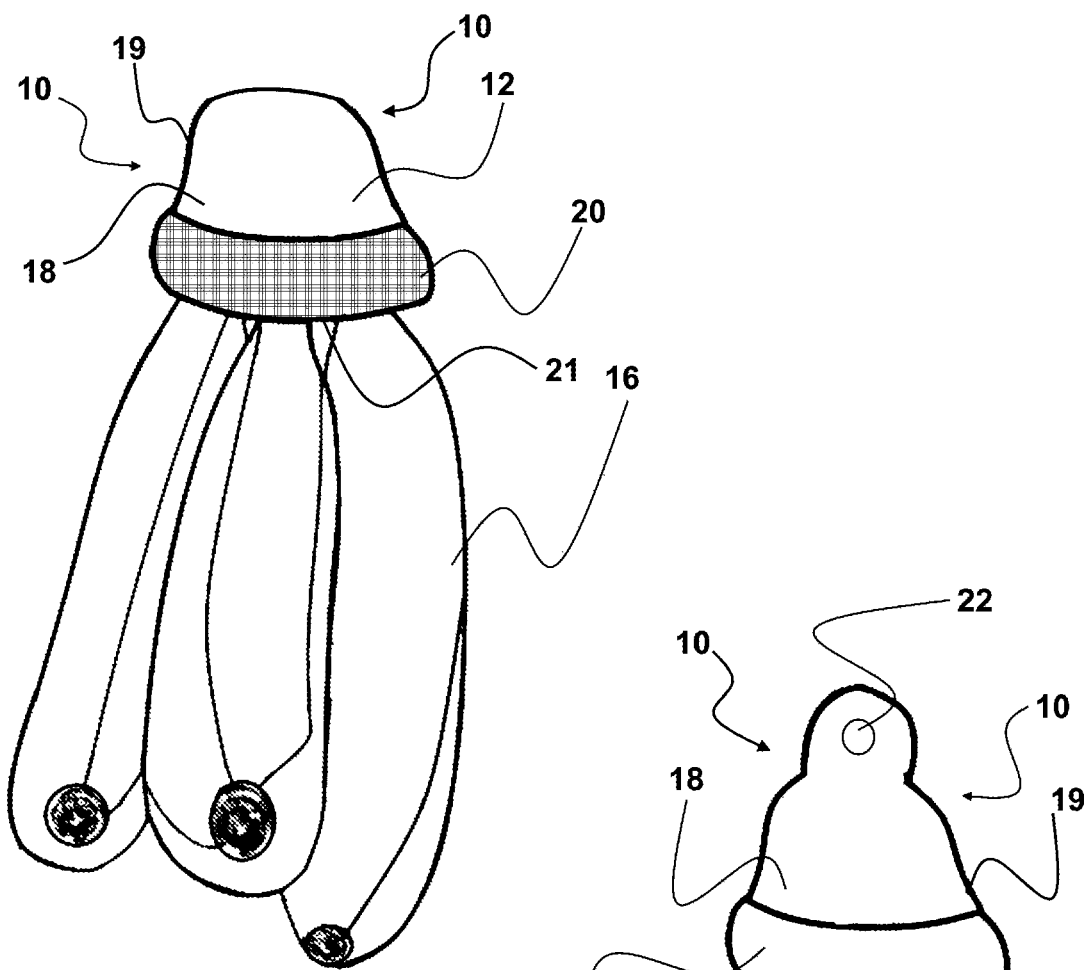
FIG. 2 shows the device depicted in FIG. 1 operatively engaged over the crown portion of a banana bunch and showing an elastic elastomer portion of the body adjacent the opening at the first end in a biased encircled compressed engagement on the exterior circumference thereof.

In FIG. 2 is shown the device 10 depicted in FIG. 1, which has been positioned to an operative engagement over the crown portion of a bunch of bananas 16. As shown in FIG. 1, the body 18 of the device 10 has a shape defined by a sidewall 19 extending from a first end of the body 18 where an opening 21 is positioned for insertion of the crown 14 of a banana bunch into an interior cavity 25 of the body 18 of the device 10. This sidewall 19 surrounds and defines the interior cavity 25.

At the first end of the body 18 is preferably located a first annular ring 20 portion of the body 18 which is formed of the same elastomer material as the body 18 as part of the sidewall 19. The first annular ring 20 is located at or adjacent the edge of the sidewall surrounding the opening 21 into the interior cavity 25. Such can be seen in the sectional view of FIG. 9 which shows this first annular ring 20 formed of elastomer material. If formed as part of or integral to the sidewall 19, the diameter of the elastomer material forming the first annular ring 20 is substantially at least 25% thicker than the material forming the sidewall 19. This forms the first annular ring 20 with thicker elastomer material which has significantly more biasing force when contracting once stretched around the crown 14 and banana bunch. This enhances the formed biased encircled first seal on either the surface of the crown 14 or on the bananas where they engage with the crown 14.

Figure 3:
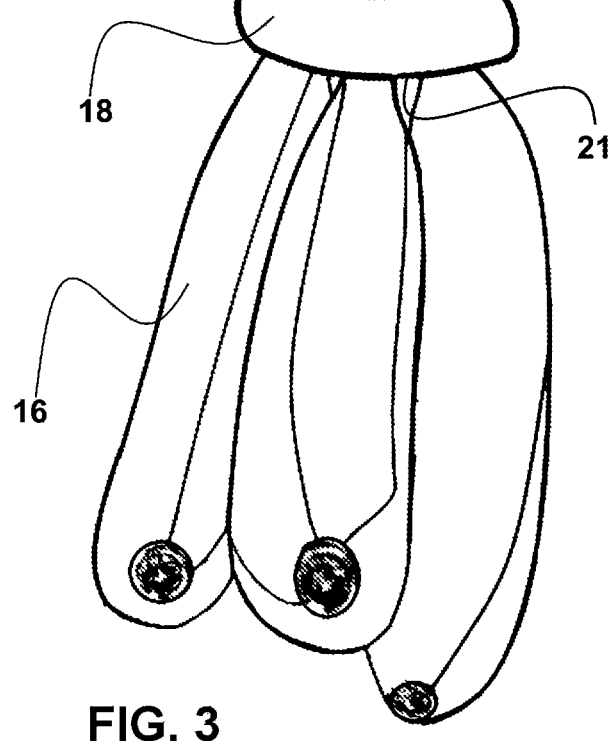
FIG. 3 shows a mode of the device, as in FIGS. 1-2, with a connector extending from an endwall at the second end of the body which is adapted to engage with a support to hold the banana bunch suspended over a support surface.

Insertion of the crown 14 into the interior cavity 25 as shown in FIG. 2-3, positions the first ring 20 stretched around and compressing on the exterior surface of the banana bunch either on a portion of the crown 14 or on the surfaces of the bananas adjacent to where they connect to the crown.

This biased contact of the first ring 20, circumferentially around the bananas connected to the crown 14, forms a first seal and prevents or slows ripening gases from communicating to the crown 14 which is located within the interior cavity 25 surrounded by the air impervious elastomer sidewall 19 and protected from surrounding air and gas intrusion into the interior cavity 25 by the sidewall 19 and the first seal formed by the first ring 20 forming the encircling of the bananas and or crown 14. This isolates the crown 14 within the interior cavity 25 from any air or gases in the atmosphere surrounding the body 18. By stretched biased engagement is meant herein that the elastomer material forming the first ring 20 or a second ring 24, as shown below, has been stretched and elongated from its unstretched or static size, such as shown in FIG. 1, and allowed to contract and then biasly contact around the exterior surface of the crown 14 or multiple bananas 16 connected to the crown, which has a circumference or contact surface therearound, which is of a size or distance larger than the static or unstretched size. Such a first stretched biased engagement can be seen in FIGS. 2-3.

In addition to forming a first seal around the banana bunch or the crown 14, this first stretched biased engagement is favored as a means for the body 18 to grip a bunch of bananas 18 securely. So engaged, the bunch of bananas may be held elevated as described herein with the body 18 of the device 10 gripping it at the first stretched biased engagement, and a connector 22 positioned on the body 18 at the second end thereof, positioned on a mount such as a hook or the like.

Shown in FIG. 3 is a mode of the device 10 as in FIGS. 1-2 with the addition of such a connector 22. This connector 22 is positioned, as noted, in an engagement with the body 18 at the second end of the body of the device 10 opposite the opening 21 surrounded by the first annular ring 20. As noted, this connector 22 is preferred to allow the device 10 to engage with a support to hold the bunch of bananas 16 suspended over a support surface.

Figure 4:
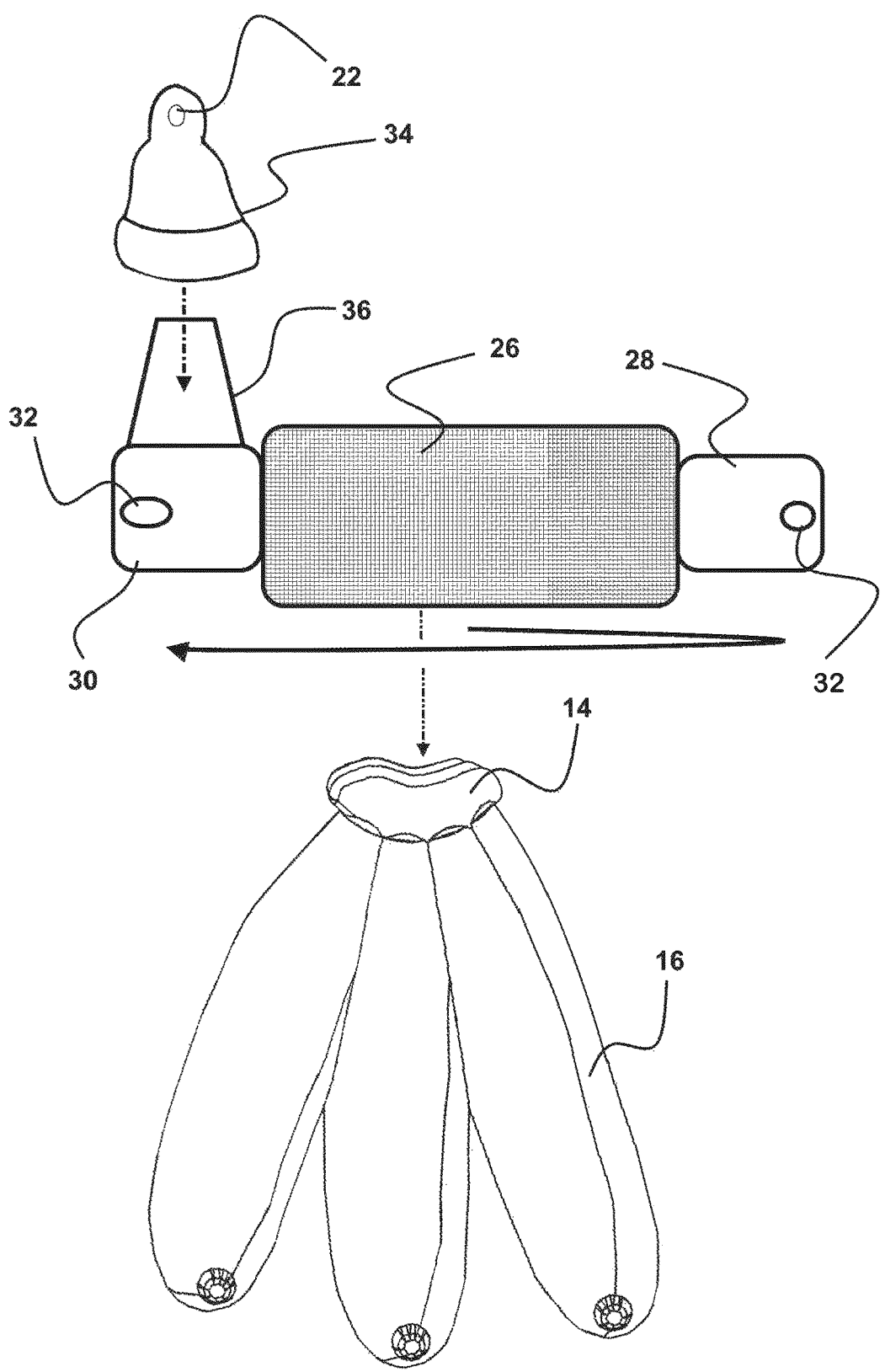
FIG. 4 shows another mode of the device which employs a foldable engagement of a first and second body portion to form the sealed cavity encircling the crown portion of the banana bunch and also showing a connector for the whimsical cap, which may be used to hold the engaged bunch elevated.

In FIG. 4 is depicted another mode of the device 10 which is structured and functions differently from the device 10 of FIGS. 1-3 and 5-13 herein. As shown, the sealed interior cavity is formed by a planar sheet of elastomer material 26 which may be formed into a cap which is slid over the crown 14 or may be in its planar shape and folded over or stretched and wrapped around the crown 14. This mode allows users to engage the elastomer material 26 to the crown 14 to form a seal therearound to prevent gases from reaching the crown 14.

With the crown 14 positioned against a surface of the planar elastomer material 26, a first body portion 28 is engaged to a second body portion 30 by folding the elastomer material and engaging cooperative connectors 32 located on the two body portions. This removable engagement of the two body portions to each other will hold the planar elastomer material 26 wrapped around the crown 14 in a first stretched biased engagement therearound, to eliminate or significantly reduce the amount of ripening gases communicated thereto.

Also shown in FIG. 4 is an engageable cover or cap 34 which connects over a mount 36. The cap 34 may be formed of or have elastomeric material therein to biasly engage over the post 36. So engaged, the cap 34 may be colorized or have other indicia thereon to define a visually discernable day identifier which informs users of the day of the engagement of the device 10 and, thus, an age of the bunch of bananas 16 so engaged. A connector 22 may be positioned on the cap 34 as shown.

In FIGS. 5-6 is depicted side and perspective views of the device 10 similar to that of FIGS. 1-3, showing the sidewall 19 defining the shape and size of the body 18, extending from an opening 21 at the first end. At the distal edge of the sidewall 19, which defines the opening 21 at the first end of the body 18, is positioned an elastomeric first ring 20. As noted, this first ring 20, when in a stretched biased engagement around the crown 14 or the bananas 16 adjacent their connection to the crown 14, forms a first seal to prevent air and gas from the surrounding atmosphere from reaching the crown 14, which will be held within the interior cavity 25 of the body 18.

Also shown is an endwall 38 of the body 18 which is positioned at the second end of the body 18. In a preferred mode of the device 10, a magnet 40 is in an engagement to the endwall 38. As shown in FIG. 5, this engagement may be with adhesive to the endwall or another connection, such as a screw or rivet. In FIG. 6, the magnet 40 is positioned on a clip 42 which connects within recesses 44 formed in the endwall 38. As in all modes the body 18 including the sidewall 19 and endwall 38 are formed of an elastomeric material which will not pass liquid or air therethrough, thereby forming the interior cavity 25 within the endwall 38 and sidewall 19, which is separated from the air in the surrounding atmosphere, as well as gases which, if communicated to the crown 14, will cause the ripening of the bananas 16.

The magnet 40, shown in multiple figures herein, can be employed to hang the body 18 from a magnetically attractive hook or surface, to also hang the bananas which are held in removable engagement to the body 18 by the first stretched biased engagement within the first ring 20. Additionally, the magnet 40 can be employed to hold the removable cap 34 on the second end of the body 18 which, as noted, provides color or lettering or other indicia as a visually discernable day identifier as to the day the device 10 was engaged to bananas 16.

Figure 7:
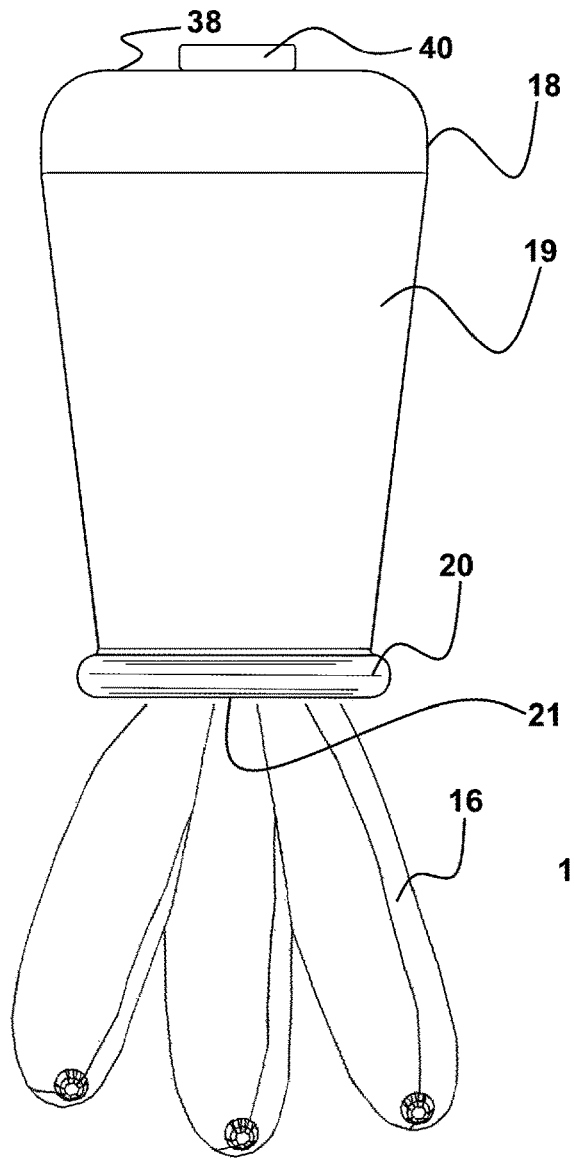
FIG. 7 shows the device as in FIGS. 5-6 operatively engaged to the crown portion of a bunch of bananas where the first ring formed a biased contact with the bunch of bananas thereby sealing the crown within the internal cavity of the body.
Figures 9, 10:
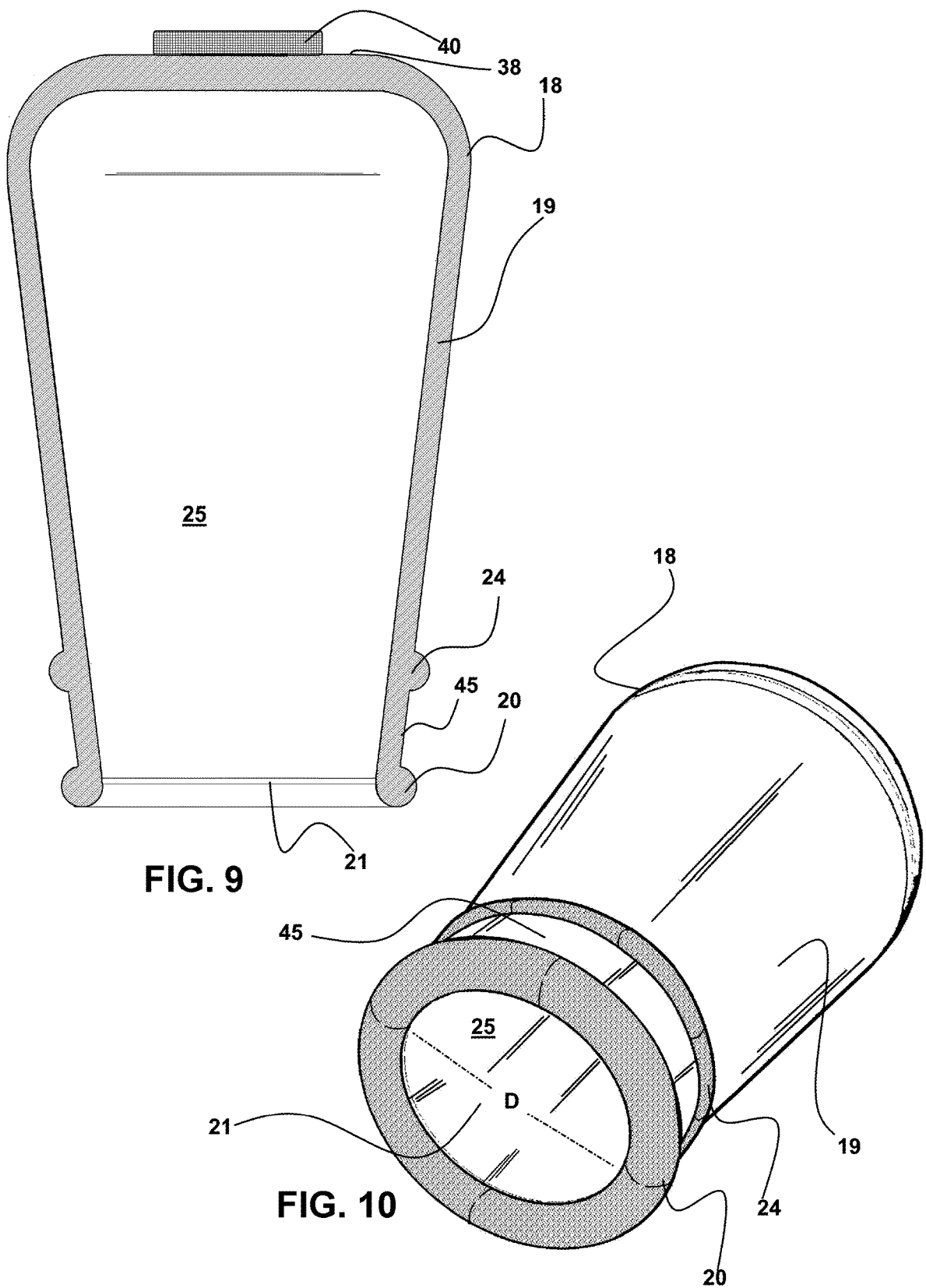
FIG. 9 is a sectional view through the device of FIG. 8.
FIG. 10 is a perspective view of the device of FIGS. 8-9 showing the first ring surrounding the opening into the interior cavity and showing the second annular ring adjacent and running parallel thereto.

FIG. 7 shows the device 10, as in FIGS. 5-6, where the body 18 is operatively engaged to position the crown 14 portion of a bunch of bananas 16 sealed within the interior cavity 25 (FIG. 9). As shown, a first ring 20 is positioned to surround the edge of the sidewall 19 where it intersects and defines the opening where the first ring formed a biased contact with the bunch of bananas thereby sealing the crown within the internal cavity of the body.

Figure 8:
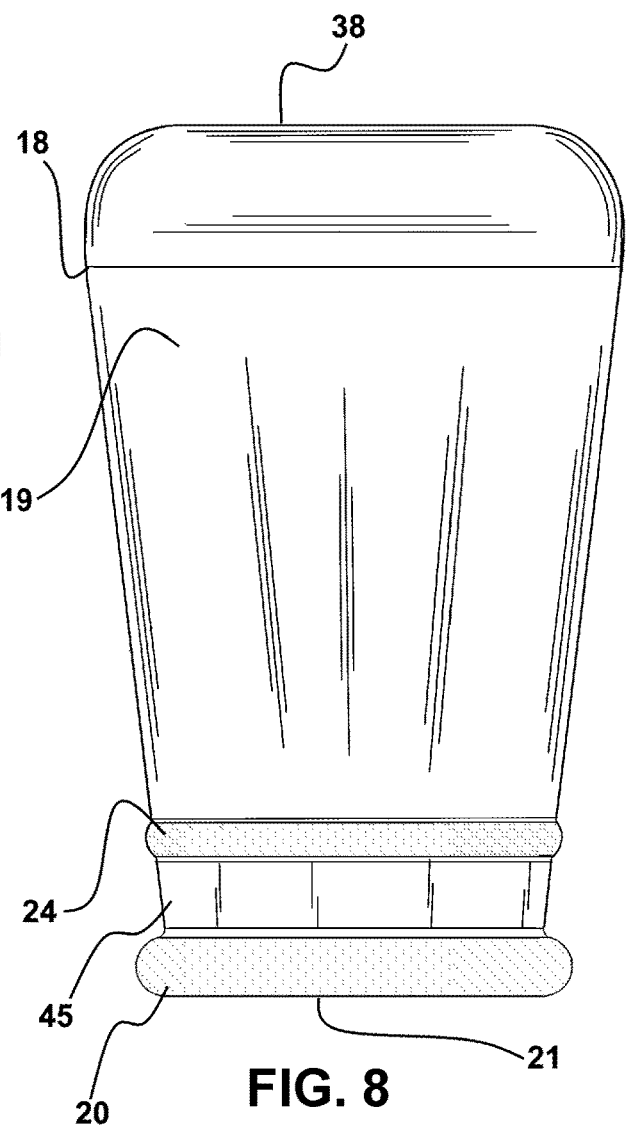
FIG. 8 shows the device in a fashion similar to that of FIG. 5-7 but where a second annular ring is positioned adjacent to the first ring surrounding the opening.

FIG. 8 shows the device 10 in a fashion similar to that of FIG. 5-7 but where a second annular ring 24 is positioned upon the sidewall 19 across a gap 45 from the first annular ring 20. As with the first annular ring 20, the second annular ring 24 is preferably formed as part of the sidewall 38 of the same elastomeric material. As with the first annular ring 20, the second annular ring 24 is at least 25 percent thicker in diameter than the diameter of the sidewall 38 which can best be seen in the sectional view of FIG. 9. The second annular ring 20 will stretch and contract in the same fashion as the first annular ring 20 and allow the opening 21 to be stretched to position the banana crown 14 within the interior cavity 25. Thereafter, the force to stretch the first annular ring 20 and second annular ring 24 is relaxed and both rings contract toward their unstretched or static sizes. Once contracted, the first annular ring 20 forms the first stretched biased engagement around the bananas 16 and/or crown 14 to form a first seal, and the second annular ring 20 contracts to form a second stretched biased engagement around the bananas 16 and/or the crown 14 and forms a second seal to keep surrounding air from reaching the crown 14 within the interior cavity 25.

FIG. 9 shows a sectional view through the device 10 of FIG. 8 and more clearly shows the first ring 20 formed at the intersection of the sidewall 19 with the opening 21 and showing the second ring 24 positioned across a gap 45 from the first ring 20. As can be seen, the first ring 20 and second ring 24 are formed as a unitary structure with the sidewall 19 of the body 18, and each is at least 25% wider than the diameter of the sidewall, to thereby provide increased bias, when stretched, and increased bias in contact against and around the crown 14 and bananas 16 connected to it, at the first seal and second seal.

Shown in FIG. 10 is a perspective view of the device 10 of FIG. 8-9 showing the body 18 defined by the shape of the sidewall 19. Also shown is the opening 21 which has a diameter D which could be eliminated but currently is at least inch. Forming the diameter with a slight gap between the sidewall 19 and first ring 20 makes it easier for the user to be able to insert the crown 14 through the opening 21 and into the interior cavity 25 by pulling on the sidewall or first ring 20 while pushing the crown 14 through the opening. Once the crown 14 is pushed past the second ring 24, it forms the second seal around the crown 14 or the bananas connected to it, and the first ring 20 forms the first seal across the gap 45.

Figure 11:
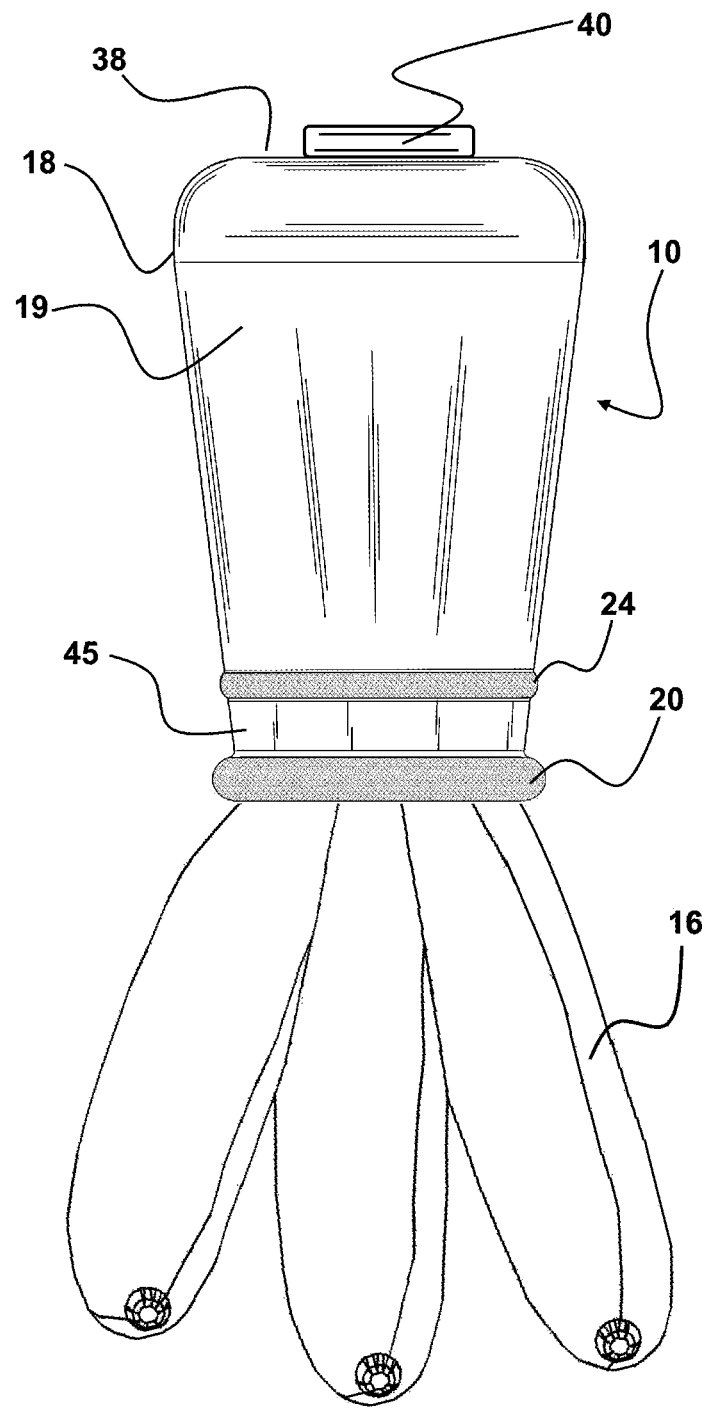
FIG. 11 depicts the device of FIGS. 8-10 operatively engaged with the crown end of a bunch of bananas wherein a first biased encircling compressive seal is formed by the first annular ring and a second biased encircling compressive seal is formed adjacent thereto, thereby forming a double seal on the crown end.

FIG. 11 shows the device 10 of FIGS. 8-10 operatively engaged with the crown end of a bunch of bananas 16 wherein a first biased encircling compressive seal is formed by the first annular ring 20, and a second biased encircling compressive seal is formed on the banana bunch adjacent thereto across the gap 45 therebetween. In this mode, the two seals provide additional protection from ripening gases reaching into the interior cavity 25. Also shown in FIG. 11 is the magnet 40, which is in an engagement to the endwall 38 and, as noted, is used to hold a cap 34 on the body 18 to identify the day of insertion and can be used to hold the device 10 to a magnetically attractive surface, such as a hook or planar piece of ferrous metal.

Figure 12:
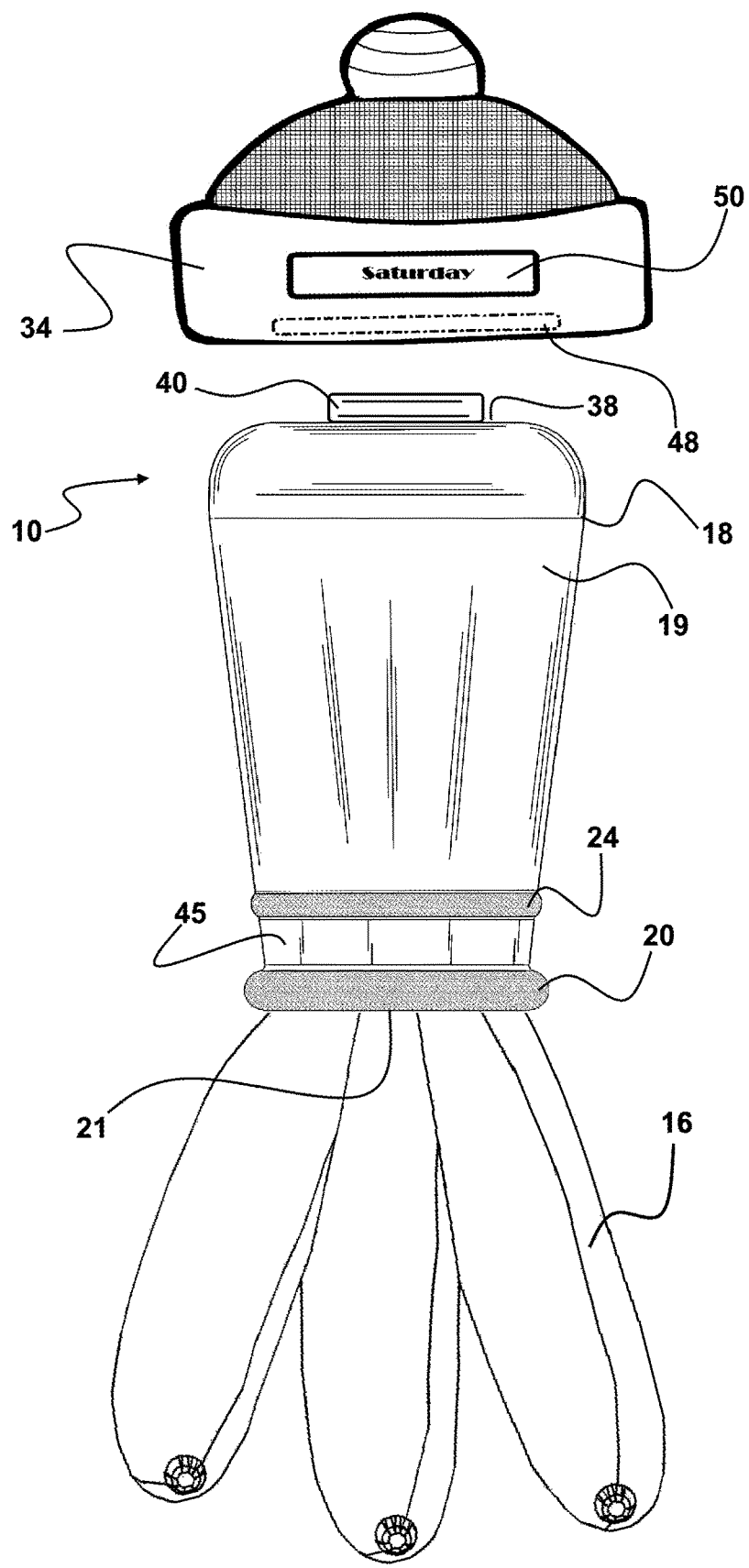
FIG. 12 shows the engageable cap, which may be from a kit of seven caps bearing indicia identifying a day the device has been engaged to the bunch of bananas, which is magnetically attachable to the second end of the body.
Figure 13:
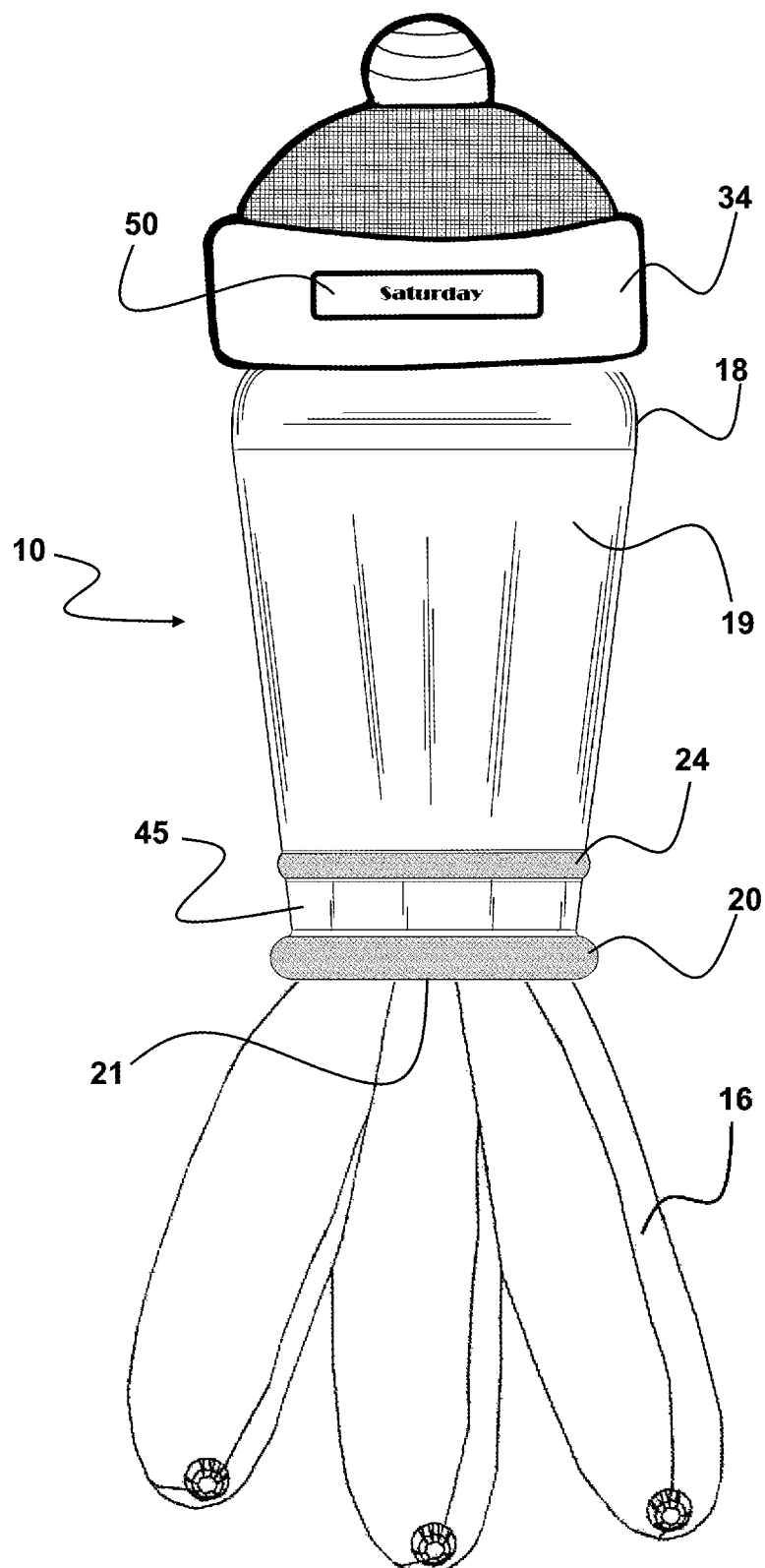
FIG. 13 shows the device as in FIG. 12 with the cap magnetically connected to the body of the device.

Shown in FIG. 12 is the magnetically engageable cap 34, which has a magnetically attractive section 48 therein which will hold the cap 34 on the body 18 through magnetic attraction. Also shown is day identification indicia 50 on the cap 34 which identifies the first day the body 18 was engaged to the bananas. This may be alphanumeric, as shown, or formed by colors or other indicia identifying days. The cap 34 engaged to the body 18 is shown in FIG. 13.

While all of the fundamental characteristics and features of the banana bunch engageable preservation system have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A banana crown cover, comprising:
a body, said body formed of elastomer material;
said body having a sidewall surrounding an interior cavity of said body;
said sidewall extending between an opening at a first end of said body, to a second end of said body, said opening communicating with said interior cavity;
a first annular ring formed of said elastomer material in a first unitary structure as part of said sidewall, said first annular ring surrounding said opening;
said sidewall having a second annular ring formed of said elastomer material, said second annular ring formed in a second unitary structure as part of said sidewall;
a portion of said sidewall positioned between said first annular ring and said second annular ring defining a gap therebetween;
a projecting portion of said first annular ring extending from an exterior surface of said sidewall thereby forming a grip for pulling said body to position a crown of a banana bunch into said interior cavity to an engaged position thereof;
said first annular ring forming a first seal encircling around said banana bunch with said body in said engaged position;
said second annular ring forming a second seal encircling around said banana bunch with said body in said engaged position;
an endwall positioned at said second end of said body in a connection with said sidewall, then endwall including at least one recess;
a magnet connected to a clip configured to connect with the at least one recess;
a cap, said cap having an engaged position engaged around said second end of said body;
said cap having a magnetically attractive component; and
a magnetic attraction between said magnet and said magnetically attractive component, forming a magnetic engagement to hold said cap in said engaged position around said second end of said body.

* * * * *